United States Patent
Menin

(10) Patent No.: US 7,017,543 B2
(45) Date of Patent: Mar. 28, 2006

(54) INTAKE MANIFOLD IN TWO PARTS

(75) Inventor: Denis Menin, Houssen (FR)

(73) Assignee: Mark IV Systems Moteurs (SA), Courbevoie (FR)

( * ) Notice: Subject to any disclaimer, the term of this patent is extended or adjusted under 35 U.S.C. 154(b) by 0 days.

(21) Appl. No.: 10/717,818

(22) Filed: Nov. 20, 2003

(65) Prior Publication Data
US 2004/0154574 A1    Aug. 12, 2004

(30) Foreign Application Priority Data
Nov. 20, 2002   (FR) .................................. 02 14544

(51) Int. Cl.
*F02M 35/10* (2006.01)
(52) U.S. Cl. .............................. 123/184.42; 123/184.61
(58) Field of Classification Search ........... 123/184.42, 123/184.61
See application file for complete search history.

(56) References Cited

U.S. PATENT DOCUMENTS

| | | | | |
|---|---|---|---|---|
| 4,175,504 A | * | 11/1979 | Ederer et al. | ........... 123/184.42 |
| 4,301,775 A | * | 11/1981 | Smart et al. | ........... 123/184.61 |
| 4,784,185 A |   | 11/1988 | Friedrichs | |
| 4,805,564 A | * | 2/1989 | Hudson, Jr. | ............ 123/184.42 |
| 5,851,456 A |   | 12/1998 | Mukawa et al. | |
| 6,752,115 B1 | * | 6/2004 | Fiesel et al. | ........... 123/184.42 |
| 2002/0050261 A1 |   | 5/2002 | Miyahara et al. | |

FOREIGN PATENT DOCUMENTS

| | | |
|---|---|---|
| EP | 0 432 919 A1 | 6/1991 |
| FR | 2 712 636 | 5/1995 |
| GB | 2 279 035 A | 12/1994 |
| WO | WO 02/081899 A1 | 10/2002 |

* cited by examiner

*Primary Examiner*—Mahmoud Gimie
*Assistant Examiner*—Katrina B. Harris
(74) *Attorney, Agent, or Firm*—Merchant & Gould P.C.

(57) ABSTRACT

The present invention relates to an intake manifold or distributor for an air feed circuit for an internal-combustion engine comprising, on the one hand, an intake or plenum chamber of elongate shape and provided at one of its longitudinal ends with an intake aperture and, on the other hand, at least two pipes laterally connected to said chamber, said pipes extending at least partially around said intake chamber from their inlet apertures opening therein and having a curved structure over at least a portion of their length.

Manifold characterised in that it consists of two parts (6 and 7) produced by injection moulding of thermoplastic material and joined together in the region of peripheral joint zones located on a joining surface (8') crossing said manifold (1).

9 Claims, 8 Drawing Sheets

INTAKE MANIFOLD IN TWO PARTS

The present invention relates to the field of intake manifolds or distributors for vehicles with thermal engines, and concerns an intake manifold formed from two constituent parts and a method of producing a manifold of this type.

BACKGROUND OF THE INVENTION

The invention is more particularly concerned with intake manifolds comprising, on the one hand, an intake or plenum chamber of elongate shape and provided at one of its longitudinal ends with an intake aperture and, on the other hand, at least two pipes laterally connected to said chamber, said pipes extending at least partially around said intake chamber from their inlet apertures opening therein and having a curved structure over at least a portion of their length.

Until now this type of manifold has generally been produced by joining three distinct parts, namely a first part forming a portion of the wall of the plenum chamber, a second part forming the complementary portion of the plenum chamber and a longitudinal portion of the pipes and a third part forming the longitudinal part complementary to said pipes.

To produce this manifold, it is therefore necessary to provide two joining interfaces and to proceed with two vibration welding operations, resulting in a high manufacturing cost, an increased risk of producing non-specification parts and the use of a greater mass of material.

Furthermore, the multiplication of joining zones, and in particular the presence of joint zones in the region of inlet and outlet apertures for the pipes structurally and mechanically weakens the resultant manifold.

SUMMARY OF THE INVENTION

The object of the present invention is to overcome at least some and preferably all of the drawbacks mentioned above.

To this end, the invention has for its object a manifold of the above-mentioned type, characterised in that it consists of two parts produced by injection moulding of thermoplastic material and joined to one another in the region of peripheral joint zones located on a joining surface crossing said manifold, a first part in one piece forming a first longitudinal portion of the casing defining the intake chamber, an intermediate portion of a side portion of the wall of each of the various pipes and an end conduit segment of each of said pipes ending in the outlet aperture of each of them, and a second part in one piece forming a second complementary longitudinal portion of the casing defining the intake chamber, an end conduit segment of each of said pipes ending with the inlet aperture of each of these pipes opening into the intake chamber and a complementary intermediate portion of a side portion of the wall of each of the pipes.

BRIEF DESCRIPTION OF THE DRAWINGS

The invention will be better understood, with the aid of the description hereinafter relating to preferred embodiments, given by way of non-limiting examples and described with reference to the accompanying schematic drawings, in which.

DETAILED DESCRIPTION OF THE INVENTION

Figure 1:
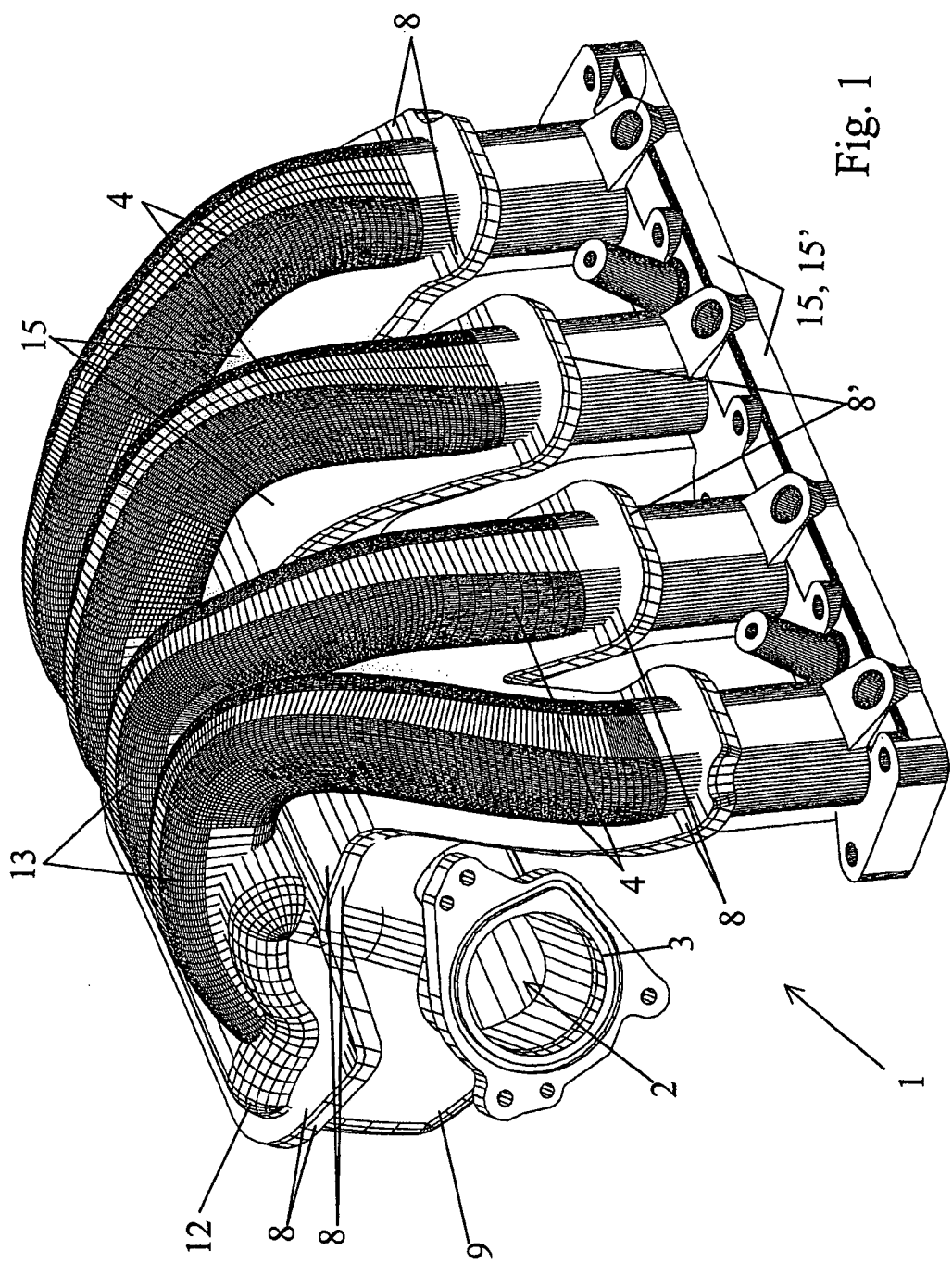
FIG. 1 is a perspective view of a manifold according to a first embodiment of the invention.

As shown in the figures of the accompanying drawings, the manifold or distributor 1 comprises, on the one hand, an intake or plenum chamber 2 of elongate shape and provided at one of its longitudinal ends with an intake aperture 3 and, on the other hand, at least two pipes 4 laterally connected to said chamber 2, said pipes 4 extending at least partially around said intake chamber 2 from their inlet apertures 5 opening therein and having a curved structure over at least a portion of their length.

Owing to the selection of a specific configuration of the joining surface 8', the invention allows the manifold 2 to be cut into only two constituent parts 6 and 7. Thus following each pipe 4 from its outlet aperture 5' to its inlet aperture 5, a first conduit segment 11 formed from one piece and being part of the first part 6 is observed first, then a second conduit segment formed by longitudinal joining of two side portions of complementary walls 10 and 14 respectively belonging to the first constituent part 6 and the second constituent part 7 and, finally, a third conduit segment 13 formed in one piece and forming part of the second part 7.

As a result it can be noticed that each pipe 4 has an inlet aperture 5 region formed by a one piece duct portion and an outlet aperture 5 region also formed by a one piece duct portion, the medium segment of each pipe 4 being formed by two half shells joined together by joint zones 8 of important size contributing to the overall strength, resistance and rigidity of the manifold.

Figure 2:
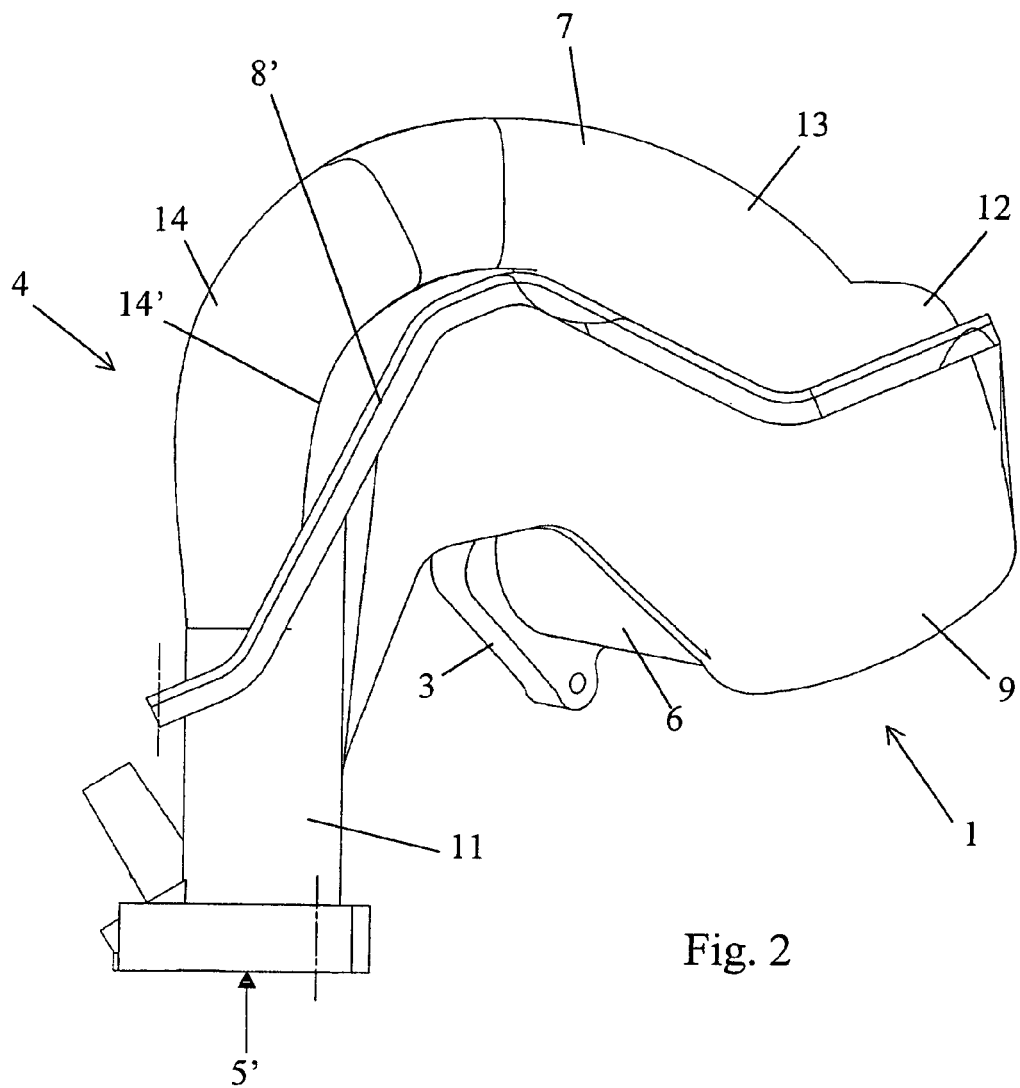
FIGS. 2 and 3 are side elevations in two opposing directions of a manifold according to the invention, as shown in FIG. 1.
Figure 3:
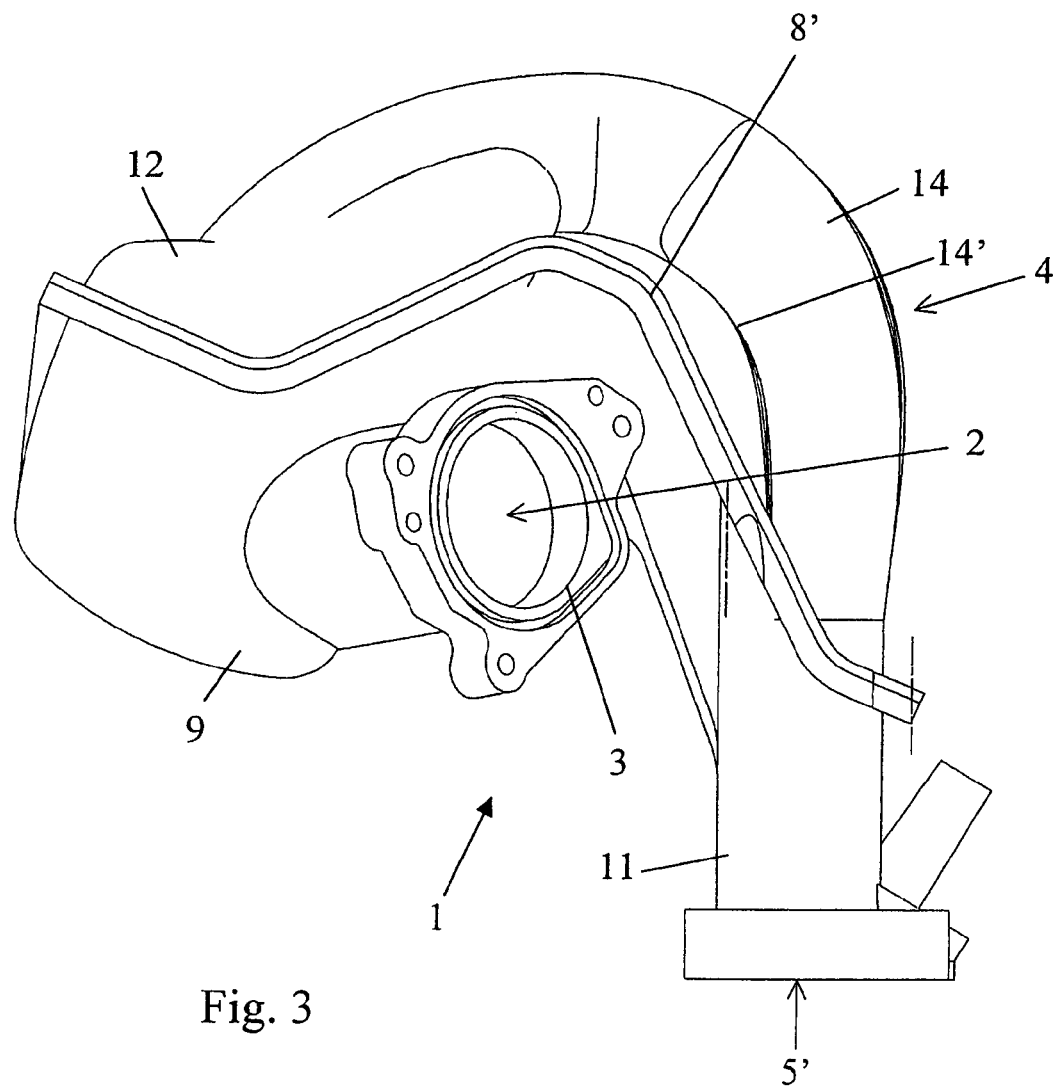
Figure 5:
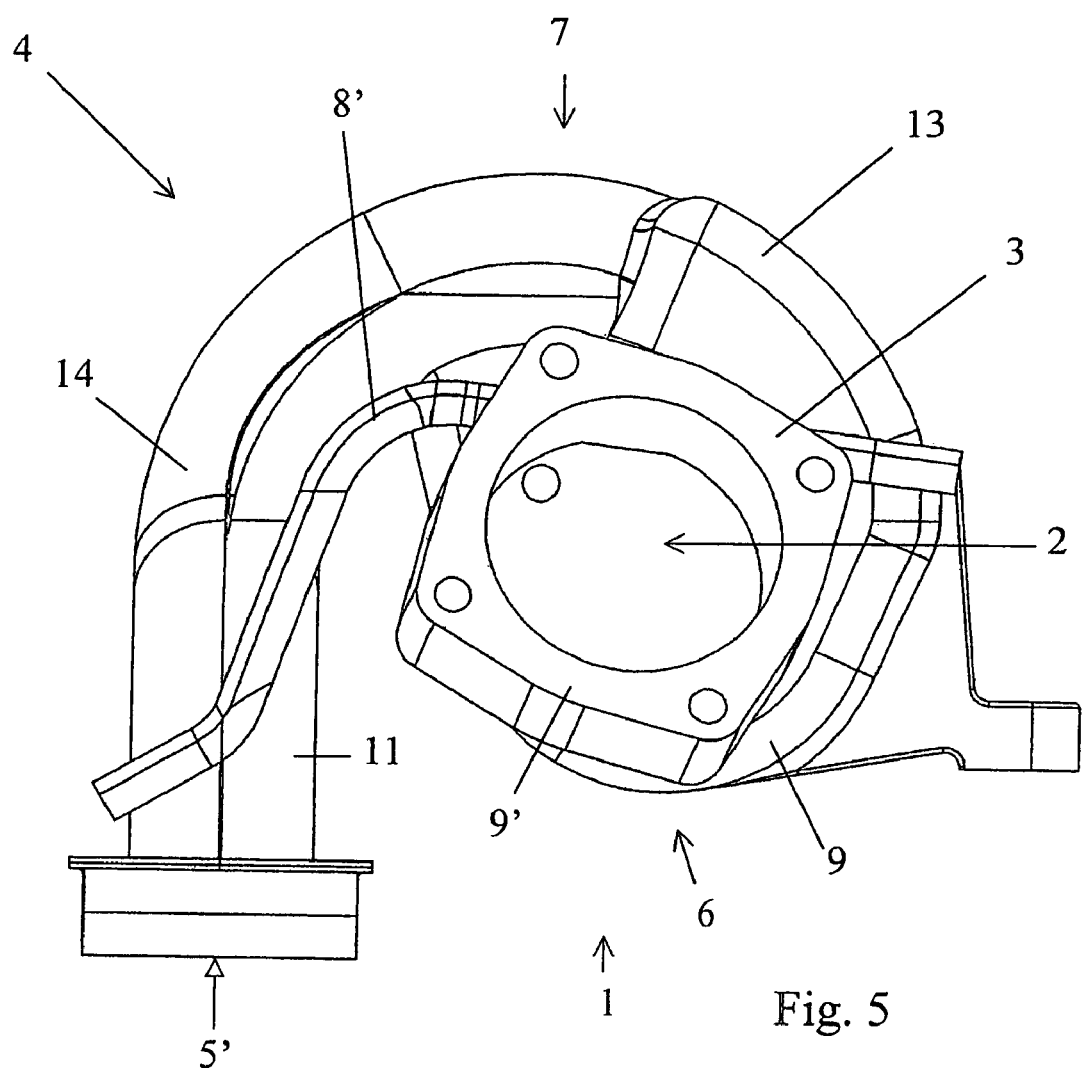
Figure 6:
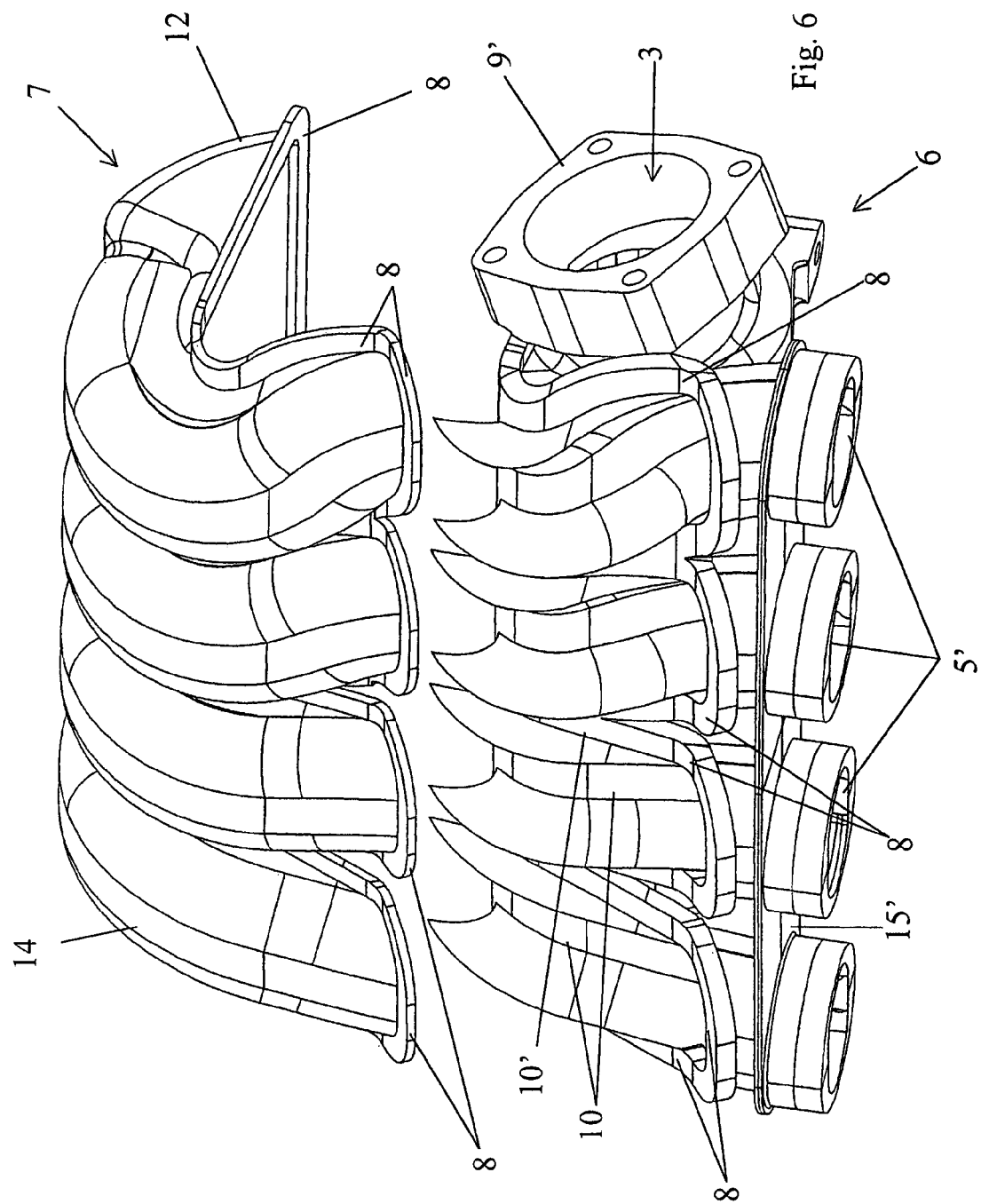
FIGS. 6 and 7 are exploded perspective views of the manifold of FIGS. 4 and 5 showing its two constituent parts and FIG. 8 is a schematic representation showing the configuration pattern of the joining surfaces of the two parts of the manifold of FIGS. 4 to 7.

Preferably, the first longitudinal portion 9 corresponds to a main portion of the casing defining the intake chamber 2 and comprises a connecting piece in one piece 9' defining the intake aperture 3, and the second longitudinal part 12 corresponds to a cover closing said first longitudinal portion 9, the joining surface 8' extending mainly below the neutral fibres or the central axes of circulation of the pipes 4 (see FIGS. 2, 3 and 5).

To obtain a manifold or distributor of which the overall structure has increased mechanical strength and rigidity, the pipes 4 may be connected to one another, between adjacent pipes, by connecting portions 15 in the form of plates or strips formed in one piece with the constituent parts 6, 7, on the one hand for the second part 7, at least in the region of the end conduit segments 13 of the pipes 4 opening into the intake chamber 2 and, if necessary, of the longitudinal edges 14' of the complementary intermediate portions 14 of side wall portions of the pipes 4 and, on the other hand for the first portion 6, in the region of the end conduit segment 11 of the pipes 4 defining the outlet apertures 5' and, if necessary, of the longitudinal edges 10' of the complementary intermediate portions 10 of side wall portions of the pipes 4, these connecting portions 15 forming an assembly and/or fixing flange 15' in one piece in the region of the end conduit segments 11 defining the outlet apertures 5'.

Advantageously the connecting portions 15 of the intermediate portions 10, 14 of lateral wall portions of pipes 4 of the first and second parts 6 and 7 thus form portions of peripheral joint zones 8.

As shown in particular in FIGS. 1, 2, 3, 5 and 7 of the accompanying drawings, and to arrive at a compact overall structure, a portion of the second longitudinal portion of the casing forming the cover 12 also forms a portion of the walls of the end conduit segments 13 of said pipes 4 ending in the respective inlet apertures 5. According to a first variation, the end conduit segments 13 of the pipes 4 opening into the intake chamber 2 comprise curved circulation axes located in respective mutually parallel planes, the segments 13 being obtained by moulding by means of a rotary core.

According to a second variation, the segments of the conduits 13 of the pipes 4 opening into the intake chamber 2 comprise curved circulation axes with helical development, these segments being obtained by moulding by means of a rotary core displaced with a combined rotational and translatory movement.

According to a third variation, not shown in the accompanying drawings, the end conduit segments 13 of the pipes 4 opening into the intake chamber 2 comprise circulation axes which are substantially rectilinear and located in respective mutually parallel planes, the segments 13 being obtained by moulding by means of a core displaced in translation, optionally in two different directions.

The invention also relates to a method of producing an intake manifold or distributor 1 as described above, characterised in that it consists in separately producing the first part 6 and the second part 7 by injection moulding of thermoplastic material, whether reinforced or not, the second part 7 optionally being produced by a mould with a rotary core, then joining these two parts 6 and 7 by vibration welding in the region of the peripheral joint zones 8.

Figure 4:
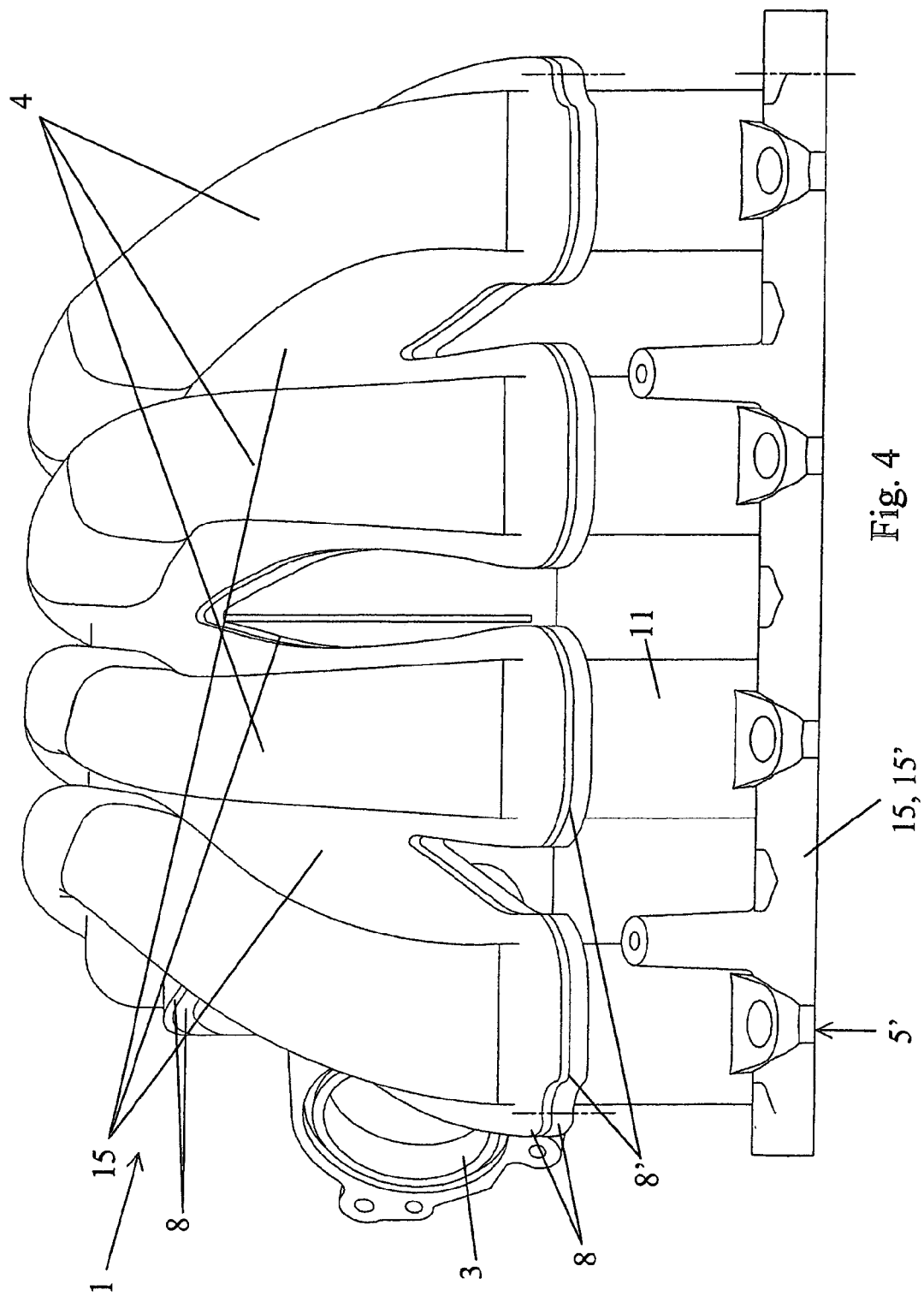
FIGS. 4 and 5 are front and side elevations of a manifold according to a second embodiment of the invention.
Figure 7:
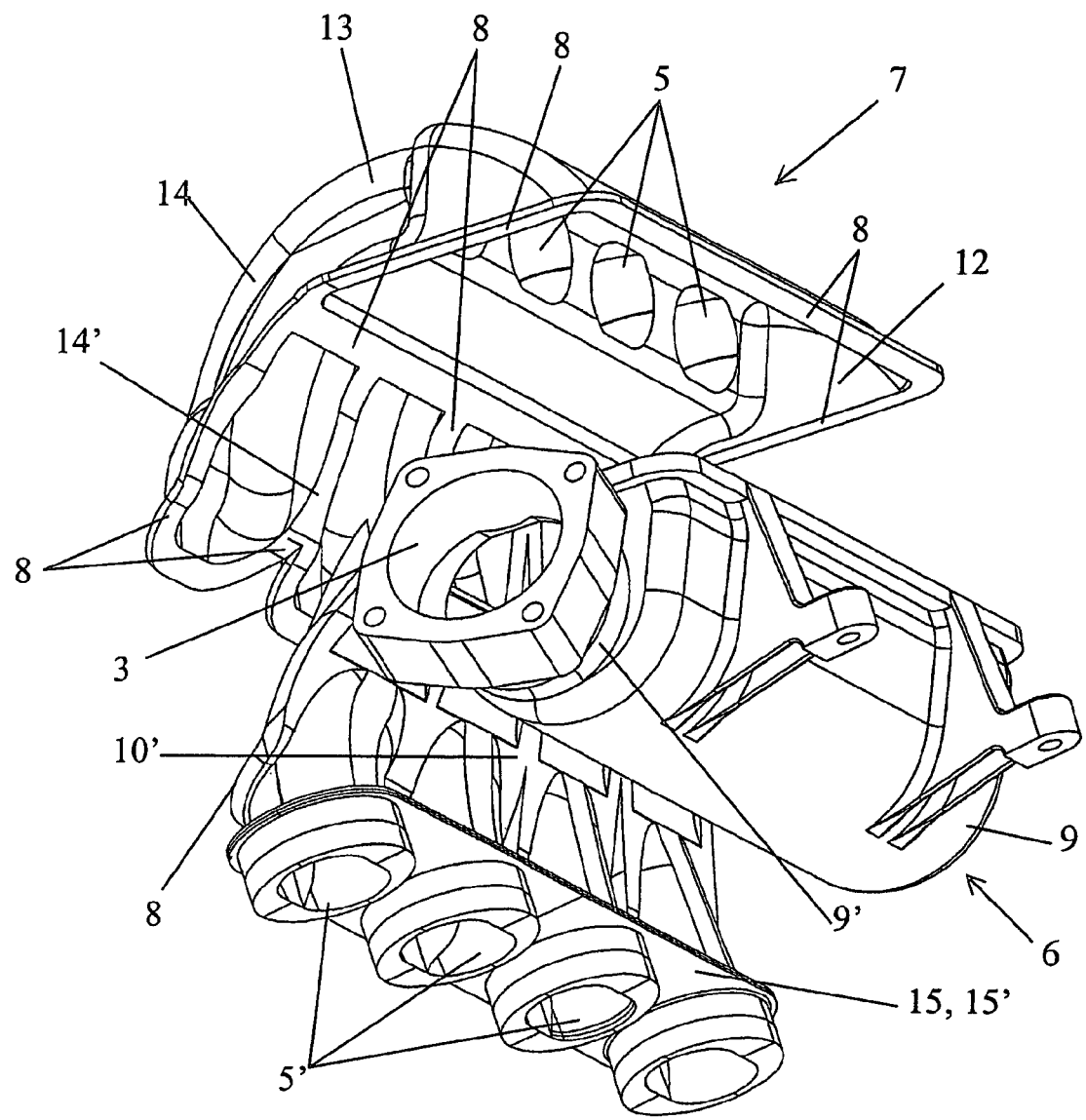
Figure 8:
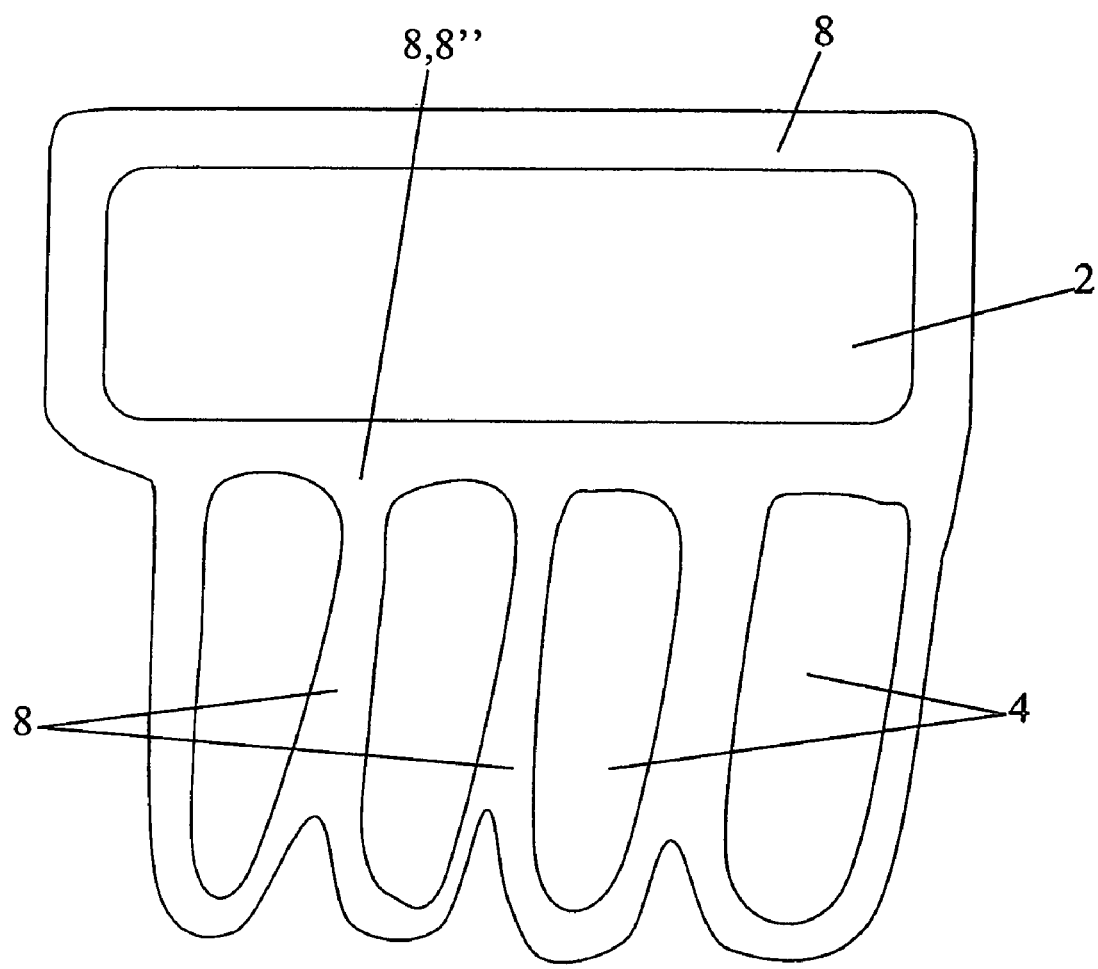

The configuration and conformation of the joint zones 8 are schematically shown is FIG. 8, and can be easily deduced from the FIGS. 4 and 7 in particular. It is noteworthy that said joint zones 8 constitute together a continuous and closed pattern comprised of four closed joint segments, one for each pipe 4, and of one closed joint segment defining the assembling region of the two shell parts 9 and 12 forming together the walls of the intake chamber 2.

This particular layout of the joint zones 8, with in particular a continuous joint region 8" shared by the joint zones of the pipes 4 and the joint zone of the intake chamber, provides an increased mechanical resistance and rigidity to said intake manifold.

Of course the invention is not limited to the embodiments described and shown in the accompanying drawings. Modifications remain possible, in particular from the point of view of the constitution of the various elements or by substitution of technical equivalents, without thus departing from the scope of protection of the invention.

What is claimed is:

1. Intake manifold or distributor for an air feed circuit for an internal-combustion engine comprising:

an intake or plenum chamber of elongated shape, having at one longitudinal end an intake aperture, and at least two pipes laterally connected to said chamber, said pipes extending at least partially around said intake chamber from inlet apertures opening therein and having a curved structure over at least a portion of the pipe length, the manifold formed from a first part and a second monolithic part, the monolithic first part forming a first longitudinal portion of a casing solely defining the intake chamber, an intermediate portion of a side portion of the wall of each of the pipes, and an end conduit segment of each of said pipes ending with an outlet aperture, and the second monolithic part forming a second complementary longitudinal portion of the casing solely defining the intake chamber, an end conduit segment of each of said pipes ending with and forming the inlet aperture of each of the pipes, opening into the intake chamber, and a complementary intermediate portion of a side portion of the wall of each of the pipes;

wherein the first part and the second part are produced by injection molding of a thermoplastic material, wherein the parts are joined to one another in a region of peripheral joint zones located on a joining surface crossing said manifold.

2. The manifold according to claim 1, wherein the first longitudinal portion corresponds to a main portion of the casing defining the intake chamber and comprises a joining piece solely defining the intake aperture and wherein the second longitudinal portion corresponds to a cover closing said first longitudinal portion, the joining surface extending mainly below neutral fibres or central axes of circulation of the pipes.

3. The manifold according to claim 1, wherein the pipes are connected to one another, between adjacent pipes, by connecting portions in the form of plates or strips formed integrally with the constituent parts for the second part, at least in the region of the end conduit segments of the pipes opening into the intake chamber and of the longitudinal edges of the complementary intermediate portions of side wall portions of the pipes and for the first part, in the region of the end conduit segments of the pipes defining the outlet apertures and of the longitudinal edges of the complementary intermediate portions of side wall portions of the pipes, the connecting portions forming an assembly and/or fixing flange in one piece in the region of the end conduit segments defining the outlet apertures.

4. The manifold according to claim 3, wherein the connecting portions of the intermediate portions of side wall portions of pipes of the first and second parts form portions of peripheral joint zones.

5. The manifold according to claim 2, wherein a portion of the second longitudinal portion of the casing forming the cover also forms a portion of the wall of the end conduit segments of said pipes ending in the respective inlet apertures.

6. The manifold according to claim 1, wherein the end conduit segments of the pipes opening into the intake chamber comprise circulation axes which are substantially rectilinear and located in respective mutually parallel planes, the segments being obtained by molding a core displaced in translation, optionally in two different directions.

7. The manifold according to claim 1, wherein the end conduit segments of the pipes opening into the intake chamber comprise curved circulation axes located in respective mutually parallel planes, the segments being obtained by molding a rotary core.

8. The manifold according to claim 1, wherein the segments of the conduits of the pipes opening into the intake chamber comprise curved circulation axes with a helical development, these segments being obtained by molding a rotary core displaced with a combined rotational and translatory movement.

9. A method for producing the intake manifold or distributor of claim 1, the method comprising:

separately producing the first part and the second part by injection molding of thermoplastic material, the second part optionally being produced by a mold with a rotary core; and joining the first and second parts by vibration welding in the region of peripheral joint zones.

* * * * *

UNITED STATES PATENT AND TRADEMARK OFFICE
CERTIFICATE OF CORRECTION

PATENT NO. : 7,017,543 B2
APPLICATION NO. : 10/717818
DATED : March 28, 2006
INVENTOR(S) : Menin It is certified that error appears in the above-identified patent and that said Letters Patent is hereby corrected as shown below:

On Title Page (73) Assignee: "Mark IV Systems Moteurs (SA)," should read --Mark IV Systemes Moteurs (SA)--

Signed and Sealed this

Twenty-first Day of November, 2006

JON W. DUDAS
*Director of the United States Patent and Trademark Office*